3,725,259
PROCESS FOR RECOVERY OF MINERAL POLLUTANTS FROM ACIDIC WASTE STREAMS
David O. De Pree, Loomis, Calif., assignor to Aerojet-General Corporation, El Monte, Calif.
Filed Dec. 4, 1970, Ser. No. 95,252
Int. Cl. C02b 1/46, 1/76
U.S. Cl. 210—30                    13 Claims

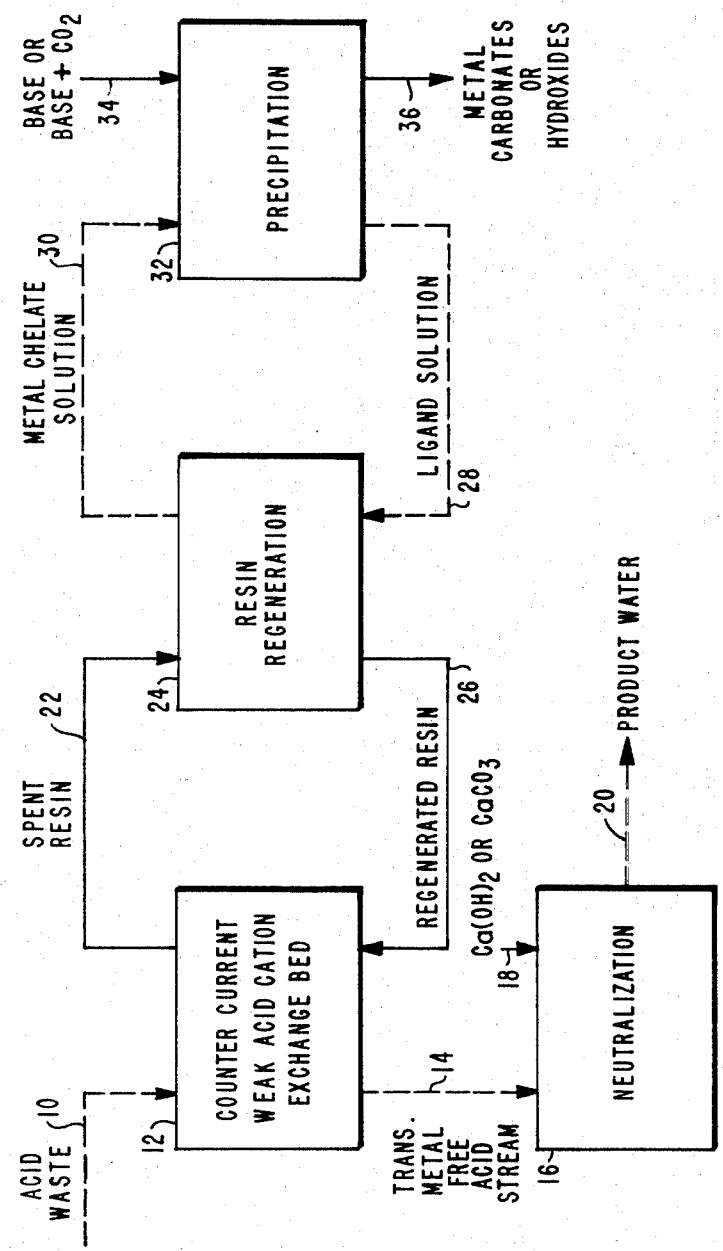

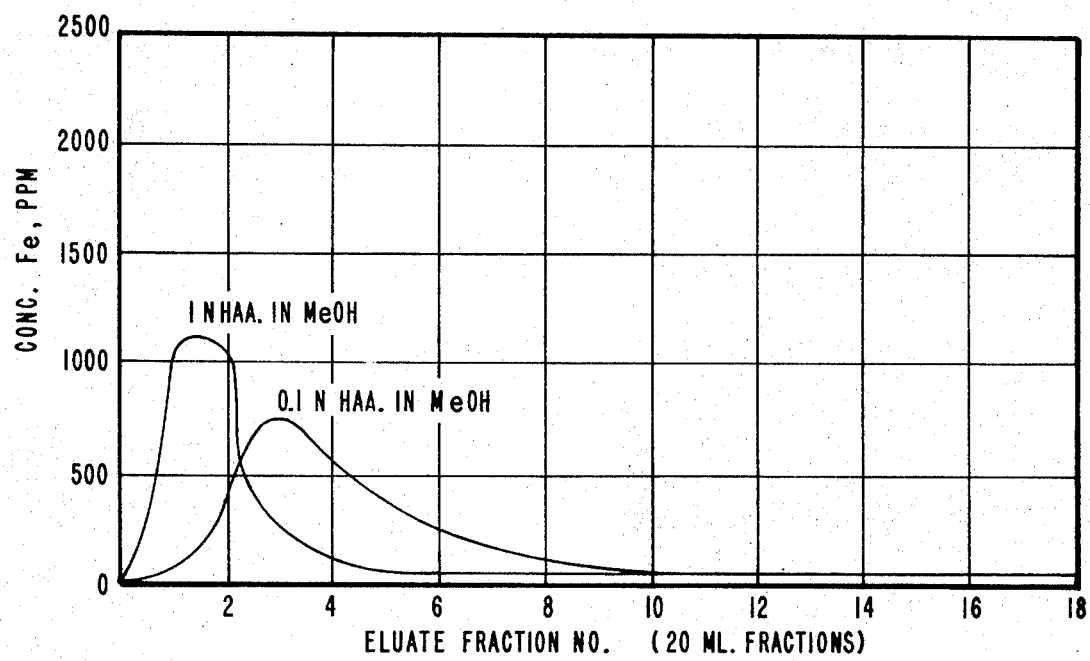
FIG.—2
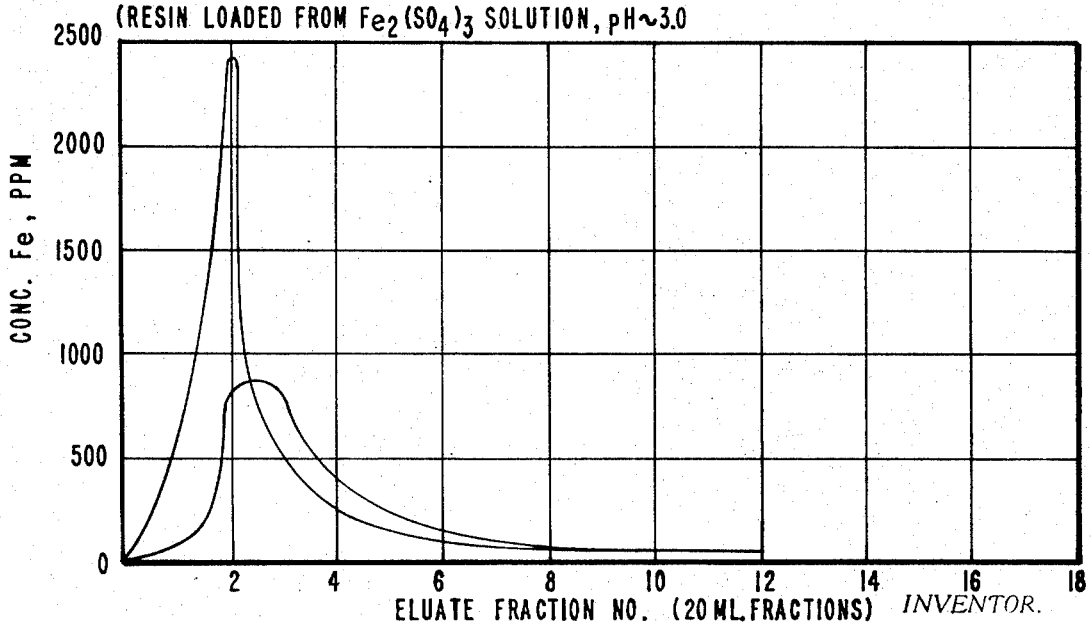
FIG.—3

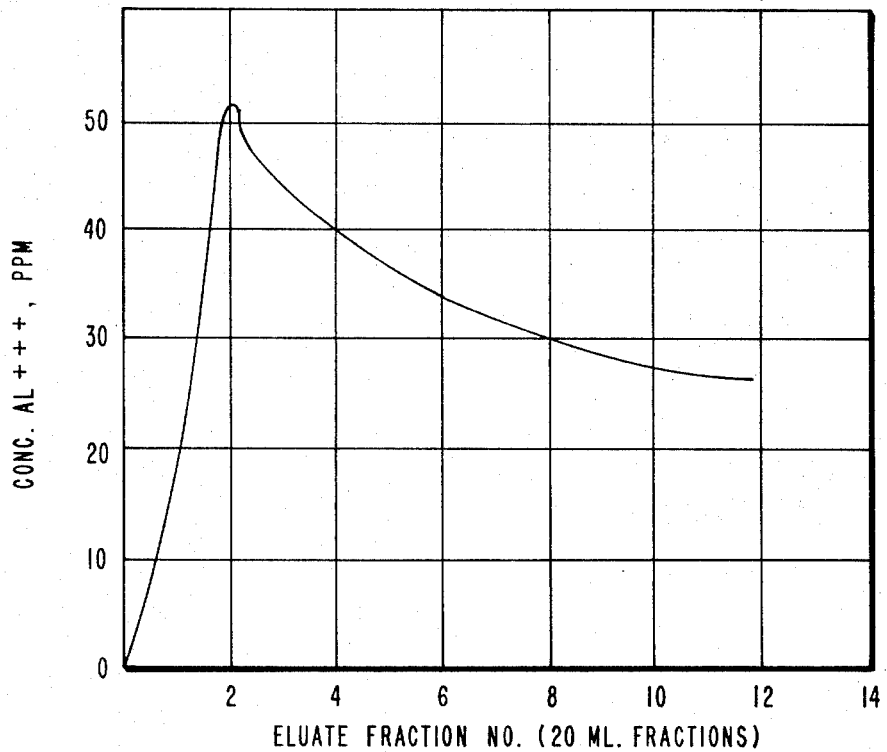
FIG.—4

ABSTRACT OF THE DISCLOSURE

This patent describes a method for the removal of Group Ib, IIb, III, IV, V, VI, VII and VIII metal salts from acidic waste streams such as acid mine drainage, pickling waste, and electroplating waste wherein the waste stream is highly acidic and contains these metal salts as pollutants which comprises: contacting said stream in countercurrent fashion with a cation exchange bed containing a moderately strong or weakly acidic cation exchange resin to deposit metal ions from said salts thereon, neutralizing the acidic effluent from the cation exchange resin to provide a neutral effluent, and regenerating said cation ion exchange resin with a solution of a chelating agent.

BACKGROUND OF THE INVENTION

It is widely recognized that modern industrial procedures have a substantial and undesirable effect on the ecology. One such source of damage to the ecology occurs in the form of waste streams from mines, pickling plants and electroplating baths. All such streams contain substantial amounts of transition metal salts as well as sulfur, usually in the form of sulfate ion. Both the transition metal salts and sulfate ion cause serious pollution problems if streams carrying these pollutants are discharged into streams, lakes and rivers. The present invention is believed to make a substantial contribution to the improvement of the ecology and to the specific problems associated with the disposal of certain types of industrial waste. Accordingly, it may be anticipated that the present invention will find wide application in a wide variety of industrial applications.

SUMMARY OF THE INVENTION

Briefly, the present invention comprises a method for the removal of Group Ib, IIb, III, IV, V, VI, VII and VIII metal salts from acidic waste streams such as acid mine drainage, pickling waste, and electroplating waste wherein the waste stream is highly acidic and contains these metal salts as pollutants which comprises: contacting said stream in counter-current fashion with a cation exchange bed containing a cation exchange resin either in the H+ or alkali or alkaline earth substituted form to deposit metal ions from said salts thereon, neutralizing the acidic effluent from the cation exchange resin, and regenerating said cation ion exchange resin with a solution of a chelating agent and precipitating the metal from said solution by treatment with a base or with a base and carbon dioxide.

According to the present invention, the chelating agent is subsequently recovered for recycle by precipitation of the transition metal with a base or with a base and carbon dioxide. If necessary, the acidity of the acid waste stream can be first adjusted to a pH of between about 3 and 5 using lime or calcium carbonate. The neutralization of the acidic effluent from the cation exchange resin is also preferably carried out with lime or calcium carbonate.

The most commonly occurring metals in acid waste streams are ferrous, ferric, aluminum, copper, zinc, nickel, chromium, cobalt and manganese salts, and it is the removal of these cations which is the prime objective of this invention.

It is an object of the present invention to provide a novel method for the treatment of acidic waste.

More specifically it is an object of the present invention to provide a novel method for the removal of Group IIb, III, IV and V metal ions from acidic waste streams.

It is a further object of the present invention to overcome the ecological problems associated with acid mine drainage, pickling waste, and electroplating waste.

These and other objects and advantages of this invention will be apparent from the more detailed description which follows taken in conjunction with the accompanying drawings.

DESCRIPTION OF THE PREFERRED EMBODIMENTS

FIG. 1 shows a simple block diagram of the process of the present invention. FIG. 2 shows the effectiveness of acetyl acetone in removing ferrous ions from a cation exchange resin. FIG. 3 shows the effectiveness of acetyl acetone in removing ferric ions from a cation exchange resin. FIG. 4 shows the effectiveness of acetyl acetone in removing aluminum from a cation exchange resin.

The acidic waste stream which is adjusted, as required to a pH of from 3 to about 5 with either lime or calcium carbonate is introduced through line 10 to the weak acid cation exchange bed 12 in a countercurrent pass. The cation exchange resin in the bed 12 removes the metals from the stream leaving a transition metal-free acid stream passing through line 14 to the neutralization zone 16. Lime [$Ca(OH)_2$] or calcium carbonate is continuously introduced via line 18 to the neutralization zone 16 to neutralize the remaining acidity in the water effluent metal-free acid stream. The purified product water is removed by line 20 in a condition suitable for discharge into streams or further industrial or other uses. The spent resin from the bed 12 is passed by line 22 to the resin regeneration zone 24. The regenerated resin from zone 26 is returned to bed 12 by line 26. The resin in the resin regeneration zone 24 is treated with a ligand or chelating solution introduced by line 28. This solution chelates the metal present in the resin prior to regeneration to form a metal chelate solution which is removed via line 30 to the precipitation zone 32. In the precipitation zone 32 the spent ligand is continuously regenerated by the addition of a base or base and carbon dioxide via line 34. The metal hydroxides formed within precipitation zone 32 are removed via line 36. The regenerated ligand solution thus obtained is continuously recycled by line 28 to resin regeneration zone 24. In general, selective separation of the transition metal ion from other cations present in the acid waste stream is achieved by pH control of the input to the cation exchange resin so that only the strongly absorbed metal ions are deposited on the resin. In most acid waste streams a single metal predominates and hence this treatment is entirely adequate. The other cation present in most acid mine waste streams is calcium which is non-toxic and therefore does not provide an environmental hazard. Some unusual streams contain a variety of both the subject metal ions and the non-toxic alkali and alkaline earth cations. Such streams may require final desalination treatment of the effluent to complete deionization.

FIG. 2 is a graphic representation of a ferrous sulfate loaded ion exchange resin being regenerated by both a 1 N and 0.1 N HAA solution in methanol. The graph shows the relationship of iron removal as a function of the acetylacetone solution passed through the iron loaded resin.

FIG. 3 is essentially the same as FIG. 2 with the exception that the resin was loaded with ferric sulfate.

The present invention is particularly applicable to the polymethacrylic cation exchange resin such as sold under the name Amberlite CG–50 and others such as polyacrylic, polysalicylic acid-formaldehyde polymers, etc. The preferred chelating agents are the $\beta$-diketones such as acetylacetone, 1-phenylbutane-1, 3-dione, dibenzoyl methane, 2-acetylcyclohexanone and alkyl, aryl or halogen derivatives thereof, the important consideration being that the metal ion to be chelated form an organic soluble chelate with any of the above ligands. It is obvious what modifications and improvements in this solubility can be achieved by modifying the $\beta$-diketone structure. The preferred solvent for the chelating agents is methanol. Other solvents which may be employed include alcohols other than methanol, aliphatic and aromatic ethers and polyethers, aromatic hydrocarbons, aliphatic hydrocarbons and mixtures of any of the above. The chelating agents are usually present in an amount sufficient to form a 0.1 N to 5. N solution. The upper limit of the chelating agent is determined by the solubility of the metal chelate in the particular solvent employed. Ferric acetylacetone, for example, is extremely soluble in methanol forming clear solution concentrations of 3 and 4 normality.

The following examples are presented solely to illustrate the invention and should not be regarded as limiting in any way. In the examples the parts and percentages are by weight unless otherwise indicated.

EXAMPLE I

Effect of pH on the deposition of iron on polymethacrylic acid resins

Both an aqueous solution of ferric sulfate (237 p.p.m.), having a pH of 3.0 and a solution of ferric sulfate (237 p.p.m.) in 0.1 N $H_2SO_4$, pH 1.5, were passed through Amberlite CG–50 resin and 20 ml. fractions of eluate collected. At pH of 3.0 the first two fractions were free of iron as indicated by treatment with KCNS solution and fractions 3 and 4 showed traces of ferric ion. At the pH of 1.5 no iron was deposited on the resin as indicated by strong positive tests for iron in all eluate fractions. Thus, it may be concluded that at pH's of 3.0 or higher ferric ion can be removed from aqueous solution. Samples of CG resin were individually loaded by treatment with 1 N $Fe_2(SO_4)_3$ solution (pH $\gamma$3.0), 1 N $FeSO_4$ solution (pH $\gamma$3.0) and $Al_2(SO_4)_3$ solution (pH $\gamma$3.0), for evaluation in regeneration experiments. The resins were thoroughly washed with distilled water to remove any undeposited cations and then with methanol and dried under vacuum.

EXAMPLE II

Regeneration of Amberlite CG–50 resins loaded with $Fe^{++}$ or $Fe^{+++}$

The recovery of iron from CG–50 resin loaded with ferrous ion was determined with 1 N and 0.1 N solution of acetylacetone in methanol. The eluate stream was dark red in color indicating the iron to have been oxidized to the ferric state either on the resin or on contact with the ligand solution (ferrous acetylacetone is not red in solution). Because both the loaded resin and the chelate represent essentially neutral compounds, oxidation with air should occur readily. No further oxidation as indicated by color change occurred on air blowing a selected sample. The concentration of iron in the eluate samples was determined by colorimetry [$Fe(AA)_3$/methanol was found to follow Beer's Law] at a wavelength of 440 m$\mu$ using a Beckman DK–2 spectrometer. The results obtained are shown in FIG. 2. These data are roughly comparable to those obtained with ferric loaded resin and show that iron is readily removed from CG–50 resin using a $\beta$-diketone reagent in methanol.

Similar results were obtained with the ferric loaded resin, FIG. 3. The recovery curve for ferric iron with 0.1 N acetylacetone is essentially identical to that obtained in the ferrous experiment. The higher, narrower peak obtained with the 1 N regenerating solution indicates a difference in eluate fraction take-off time. The peak concentration of iron is 2400 p.p.m., indicates a relatively high efficiency.

EXAMPLE III

Regeneration of manganese loaded CG–50 resin was determined with acetylacetone in methanol. A total of two and one-half grams of manganese loaded resin [3.0 milliequivalents of $M_n^{++}$/gram resin] charged to a ¼ inch chromatographic column was eluated with 100 ml. of a 1 N solution of acetylacetone in methanol. Three ml. fractions of eluate were collected and analyzed for $M_n^{++}$ by flame photometry at a wavelength of 403 m./$\mu$ using a Beckman DK–2 spectrometer. The analyses of the eluate fractions shown below demonstrate the efficiency of the regeneration of the resin.

| Fraction No.: | Conc. $M_n^{++}$, p.p.m. |
|---|---|
| 1 | 4 |
| 2 | 0 |
| 3 | 112 |
| 4 | 456 |
| 5 | 496 |
| 6 | 512 |
| 7 | 504 |
| 8 | 472 |
| 9 | 504 |
| 10 | 480 |
| 15 | 464 |
| 18 | 504 |
| 22 | 480 |
| 24 | 469 |
| 27 | 464 |
| 30 | 440 |
| 33 | 432 |

EXAMPLE IV

Regeneration of Amberlite CG–50 resin loaded with $Al^{+++}$

Regeneration of aluminum loaded CG–50 resin with 0.1 N acetylacetone in methanol indicates successful regeneration but at a far lower efficiency, FIG. 4. Again, it is possible that equilibrium conditions were not reached and it is obvious that modified acetylacetone or alternate chelating agents may be far more efficient. Aluminum is not present in most acid waste streams but does occur in many Western United States acid mine drainage streams.

Because the disposition of the Group Ib, IIb, III, IV, V, VI, VII and VIII metal ions on the cationic exchange resin in its hydrogen substituted form results in the liberation of hydrogen ions with a resultant lowering of the pH, it is desirable to control the pH in the column during the regeneration step. The result may be a drop in the efficiency in removing the desired metal ions. It is desirable, therefore, to maintain the pH of the eluate passing through the column at a constant level which represents the optimum condition for the particular ions being removed. Because alkali and alkaline earth metal ions are not absorbed on weakly acidic ion exchange resins at pH's of 5 or lower such a pH control can be achieved by using the cation exchange resin in the alkali or alkaline earth substituted form to remove the Group IIb, III, IV or V cations from the acid waste effluent. The following two examples demonstrate the essentially complete removal of ferrous iron, manganese, and aluminum from synthetic acidic mine effluent.

Mixtures of cations present in acidic wastes may also be readily removed by the subject process. The following example describes the removal of iron, aluminum and manganese from a synthetic acid mine water, regeneration of the resin, precipitation of the metal hydroxides and recovery of the regenerating chemicals for recycle.

EXAMPLE V

Preparation of synthetic acid mine water

One liter of a synthetic acid mine water (composition furnished by Dr. J. M. Shackelford, Physical Science Administrator, Federal Water Pollution Control Administration, Washington, D.C.) was prepared by dissolving the following salts in 0.01 N sulfuric acid and diluting with 0.01 N sulfuric acid to one liter.

| Salt: | Weight, g. |
|---|---|
| $CaSO_4 2H_2O$ | 0.344 |
| $MnSO_4 H_2O$ | 0.024 |
| $Al_2(SO_4)_3 18H_2O$ | 0.186 |
| $FeSO_4 7H_2O$ | 0.997 |
| $MgSO_4 7H_2O$ | 0.246 |

The pH of the solution was found to be 2.4. The metal ion composition, as determined by emission spectroscopy, was found to be as follows in p.p.m.: Fe, 205; Al, 20; Mn, 10; Mg, 27; and Ca, 95.

pH Adjustment of acid mine water and treatment with Amberlite CG-50 resin to remove transition metal ions The pH of 100 ml. of the synthetic acid mine water was adjusted to 4.5 with finely divided calcium carbonate. The addition was made very slowly because $CO_2$ evolution causes a gradual raising of the pH.

This solution was then passed through a ¼" x 9" chromatographic column containing 2.5 g. (dry weight) of water swollen Amberlite CG-50 resin (Mallinckrodt, H+ form). Three ml. samples of eluate were collected and found to have a pH of 3.1 and were analyzed for the various cations by emission spectroscopy. The data contained was as follows:

| Fraction No. | Cation conc., p.p.m. | | | | |
|---|---|---|---|---|---|
| | Fe | Al | Mn | Mg | Ca |
| 1 | <15 | <15 | | | |
| 5 and 6 | 157 | <1 | 9 | 27 | 450 |
| 9 and 10 | 155 | <1 | 8 | 22 | 300 |
| 15 | 187 | <1 | 8 | 16 | 285 |
| 20 | 187 | <1 | 7 | 18 | 370 |
| 25 | 182 | <1 | 8 | 21 | 327 |
| 30, 31 and 32 | 168 | <1 | 8 | 10 | 215 |

These data indicate that all of the aluminum, none of the manganese and approximately 25% of the iron were removed by a single pass. The increase in acidity resulting from the exchange of H+ ion from the column reduces the efficiency of the transition metal removal.

The eluate fractions were combined, the pH readjusted to 4.5 and the treatment repeated using the same resin. An equivalent reduction in transition metal ions was achieved by the recycle as indicated by the following analysis. Twenty-five ml. fractions of eluate were collected.

| Fraction No. | Cation conc., p.p.m. | | | | |
|---|---|---|---|---|---|
| | Fe | Mn | Al | Mg | Ca |
| 1 | 145 | 7.5 | <2 | 19 | 265 |
| 2 | 124 | 8.0 | <2 | 25 | 400 |
| 3 | 111 | 7.5 | <2 | 24 | 360 |
| 4 | 140 | 7.5 | <2 | 20 | 360 |

Regeneration of the cation exchange resin

The spent cation exchange resin from the treatment (two cycles) described above was treated in the chromatographic column with 100 ml. of a 2 N solution of acetylacetonate in methanol. The solution was prepared by diluting 20 g. of acetylacetonate with methanol to 100 ml. Three ml. fractions of eluate were collected and analyzed by emission spectroscopy for iron, aluminum, manganese, magnesium, and calcium. The results, shown below, indicate a very effective regeneration of the column by removal of the iron and aluminum. As manganese and little calcium or magnesium were deposited on the column, these ions are not present in the eluate.

| Fraction No. | Cation conc., p.p.m. | | | | |
|---|---|---|---|---|---|
| | Fe | Mn | Al | Mg | Ca |
| 1 | 12 | <1 | <1 | <1 | <10 |
| 2 | 600 | 70 | <1 | <1 | <10 |
| 3 | 59 | 45 | <1 | <1 | <10 |
| 4 | 13 | 50 | <1 | <1 | <10 |
| 5 | 9 | 24 | <1 | <1 | <10 |
| 6 | 8 | 14 | <1 | <1 | <10 |
| 7 | 17 | 14 | <1 | <1 | <10 |
| 8 | 4 | 11 | <1 | <1 | <10 |
| 15 | 8 | 8 | <1 | <1 | <10 |
| 20 | 4 | 7 | <1 | <1 | <10 |

Precipitation of metal ions and recovery of chelate regenerant for recycle

The chelate solution (dark red in color) from fraction 2 (approximately 2 ml. remained after removing analytical sample) was treated with concentrated NaOH in methanol containing a trace of water (2%). A dense precipitate of $Fe(OH)_3$ settled leaving a straw colored solution. The precipitate was readily removed by filtration.

Neutralization of product water

The water eluates from the cation exchange resin treatment of the synthetic acidic mine effluent were treated with calcium carbonate and adjusted to a pH of 6.0.

An alternate method which provides pH control during the deposition of iron, manganese and aluminum from acid mine water is to use the resin in either the alkali or alkaline earth metal from the high efficiency and control provided by this technique is shown in the following example.

EXAMPLE VI

The pH of a 200 ml. sample of synthetic acid mine water was adjusted to 4.5 using finely divided calcium carbonate. This solution was passed through a ¼" x 9" chromatographic column charged with 2.5 g. (dry weight) of water swollen Amberlite CG-50 resin (Na+ form). Ten ml. fractions of eluate were collected and analyzed for cation content by emission spectroscopy. The results obtained on the first 50 ml. are as follows:

| Fraction No. | Cation conc., p.p.m. | | |
|---|---|---|---|
| | Fe | Mn | Al |
| 1 | <2 | <1 | <2 |
| 2 | <2 | <1 | <2 |
| 3 | <2 | <1 | <2 |
| 4 | <2 | <1 | <2 |
| 5 | <2 | <1 | <2 |

The remaining samples were not analyzed as the data above indicated essentially complete removal of iron, manganese and aluminum.

The ion exchange resin was regenerated by treatment with acetylacetone and the eluate collected in 3 ml. fractions. The analysis of these fractions shown below confirms that iron, aluminum and manganese were all readily deposited on the resin from the acid mine water and readily removed by treatment with a methanolic solution of acetylacetone.

| Fraction No. | Cation conc., p.p.m. | | |
|---|---|---|---|
| | Fe | Mn | Al |
| 1 | 270 | 1.5 | 55 |
| 2 | 320 | 11.0 | 150 |
| 3 | 175 | 8.7 | 23 |
| 4 | 115 | 6.3 | 16 |
| 5 | 82 | 4.6 | 9 |
| 6 | 80 | 3.2 | 8 |
| 7 | 90 | 4.0 | 10 |
| 10 | 75 | 3.2 | 7 |
| 15 | 58 | 3.3 | 4 |

The cation exchange resin will be in the alkali or alkaline earth metal form if the regeneration step involves a treatment of the chelate regenerant stream with a stoichiometric quantity or excess of an alkali or alkaline earth base. It can also be converted to the Na$^+$ or Ca$^{++}$ form by a back wash with the corresponding base. These techniques reduce the amount of base required for total neutralization of the water effluent.

To provide for complete recycle of the regenerating solution without further treatment it is necessary that the alkali or alkaline earth chelate formed by the precipitation of the Group IIb, III, IV or V cation with an alkali or alkaline earth hydroxide or carbonate be soluble in the solvent system and that it displace the Group IIb, III IV or V cation in the spent ion exchange resin. The following example demonstrates that sodium acetylacetonate, a chelate meeting the above limitations which would be formed by the neutralization of the spent regenerant stream with sodium hydroxide is both very soluble in methanol and removed iron by ion exchange from a ferric iron loaded polymethacrylic acid type action exchange resin.

EXAMPLE VII

A 1 N solution of sodium acetyl acetonate was prepared by reacting 10 g. of acetylacetone (2,4-pentadione) with 4.0 g. of NaOH in methanol and diluting to 100 ml. to give a clear straw colored solution. A total of 2.5 g. of Fe$^{+++}$ loaded Amberlite CG–50 resin was swollen with water and charged to the ⅜" x 14" column washed with methanol and eluted with the sodium acetylacetonate solution. The bright red color of FeAA formed during the elution demonstrates the removal of Fe$^{+++}$ from the resin and replacement with Na$^+$. The eluate was collected as a single fraction and the resin was essentially free of the brownish iron calibration after elution. Analysis of the eluate by U.V. at 440 m., gave an iron content of 760 p.p.m.

The following examples demonstrate the application of the process to other acidic cationic solutions.

EXAMPLE VIII

When a solution of 400 p.p.m. copper sulfate adjusted to a pH of 4.5 to 5 is passed through a polymethacrylic acid resin (sodium form) the copper is deposited to give a blue colored resin and a copper free eluate is produced.

EXAMPLE IX

When a solution of 400 p.p.m. zinc sulfate adjusted to a pH of 4.5 to 5 is passed through a polymethacrylic acid resin (sodium form) the zinc is deposited and a zinc-free eluate is produced.

EXAMPLE X

When a solution of 400 p.p.m. nickel sulfate adjusted to a pH of 4.5 to 5 is passed through a polymethacrylic acid resin (sodium form) the nickel is deposited and a nickel-free eluate is produced.

EXAMPLE XI

When a solution of 400 p.p.m. cobalt sulfate adjusted to a pH of 4.5 to 5 is passed through a polymethacrylic acid resin (sodium form) the cobalt is deposited and a cobalt-free eluate is produced.

EXAMPLE XII

When the above metal-loaded resins prepared in Examples VIII and XI are treated with a methanol solution of acetylacetone at concentration of 0.1–2 N the metal ions are removed to form the acetylacetonates and the resin regenerated to give the H$^+$ form. The concentration of acetylacetone is preferably at the highest level which will provide solubility. The regeneration is accomplished at ambient temperature.

Having fully described the invention, it is intended that it be limited only by the lawful scope of the appended claims.

I claim:

1. A method for the removal of any Group Ib, IIb, III, IV, V, VI and VIII metal ions present in acidic waste streams wherein the waste stream is highly acidic and contains these metal ions as pollutants which comprises: contacting the acid stream in countercurrent fashion with a cation exchange bed containing a moderately strong or weakly acidic cation exchange resin to deposit the metal ions thereon, neutralizing the acidic effluent from the cation exchange resin to provide a neutral effluent, and regenerating said cation exchange resin with a solution of a chelating agent.

2. A method for the removal of any Group Ib, IIb, III, IV, V, VI and VIII metal ions present in acidic waste streams wherein the waste stream is highly acidic and contains these metal ions as pollutants which comprises: adjusting the acidity of said stream to a pH between about 3 and about 5, contacting said stream in conutercurrent fashion with a cation exchange bed containing a moderately strong or weakly acidic cation exchange resin to deposit the metal ions thereon, neutralizing the acidic effluent from the cation exchange resin to provide a neutral effluent, and regenerating said cation exchange resin with a solution of a chelating agent.

3. A method for the removal of any Group Ib, IIb, III, IV, V, VI, VII and VIII metal ions present in acidic waste streams wherein the waste stream is highly acidic and contains these metal ions as pollutants which comprises: contacting said stream in countercurrent fashion with a cation exchange bed containing a moderately strong or weakly acidic cation exchange resin to deposit the metal ions thereon, neutralizing the acidic effluent from the cation exchange resin to provide a neutral effluent, and regenerating said cation exchange resin with a methanol solution of a chelating agent.

4. A method for the removal of any Group Ib, IIb, III, IV, V, VI, VII and VIII metal ions present in acidic waste streams wherein the waste stream is highly acidic and contains these metal ions as pollutants which comprises: contacting said stream in countercurrent fashion with a cation exchange bed containing a moderately strong or weakly acidic cation exchange resin to deposit the metal ions thereon, neutralizing the acidic effluent from the cation exchange resin to provide a neutral effluent, and regenerating said cation exchange resin with a methanol solution of a $\beta$-diketone chelating agent.

5. A method for the removal of any Group Ib, IIb, III, IV, V, VI, VII and VIII metal ions present in acidic waste streams wherein the waste stream is highly acidic and contains these metal ions as pollutants which comprises: contacting said stream in countercurrent fashion with a cation exchange bed containing a moderately strong or weakly acidic cation exchange resin to deposit the metal ions thereon, neutralizing the acidic effluent from the cation exchange resin to provide a neutral effluent, and regenerating said cation exchange resin with a methanol solution of an alkali or alkaline earth metal chelate of a $\beta$-diketone.

6. A method for the removal of any Group Ib, IIb, III, IV, V, VI, VII and VIII metal ions present in acidic waste streams wherein the waste stream is highly acidic and contains these metal ions as pollutants which comprises: contacting said stream in countercurrent fashion with a cation exchange bed containing a moderately strong or weakly acidic cation exchange resin to deposit the metal ions thereon, neutralizing the acidic effluent from the cation exchange resin to provide a neutral effluent, and regenerating said cation exchange resin with a methanol solution of an alkali or alkaline earth metal chelate of an acetylacetone.

7. A method for the removal of any ferrous, ferric or aluminum ions present in acidic waste streams wherein the waste stream is highly acidic and contains ferrous, ferric or aluminum ions as pollutants which comprises: contacting said stream in countercurrent fashion with a cation exchange bed containing a weakly acidic cation exchange resin to deposit said ferrous, ferric or aluminum ions thereon, neutralizing the acidic effluent from the cation exchange resin and regenerating said cation exchange resin with a methanol solution of a chelating agent.

8. A method for the removal of any transition metal ions from acidic waste streams wherein the waste stream is highly acidic and contains transition metal ions as pollutants which comprises: contacting said stream in countercurrent fashion with a cation exchange bed containing a weakly acidic cation exchange resin to deposit said transition metal ions thereon, neutralizing the acidic effluent from the cation exchange resin with calcium hydroxide or calcium carbonate and regenerating said cation exchange resin with a methanol solution of a chelating agent.

9. The method of claim 7 wherein the chelating agent is a β-diketone.

10. A method for the removal of any transition metal ions from acidic waste streams wherein the waste stream is highly acidic and contains transition metal ions as pollutants which comprises: adjusting the acidity of said stream to a pH between about 3 and about 5, contacting said stream in countercurrent fashion with a cation exchange bed containing a weakly acidic cation exchange resin to deposit said transition metal ions thereon, neutralizing the acidic effluent from the cation exchange resin with calcium hydroxide or calcium carbonate and regenerating said cation exchange resin with an organic solution of a chelating agent.

11. The method of claim 8 wherein the chelating agent is a β-diketone.

12. A method for the removal of any ferrous, ferric or aluminum ions from acidic waste streams wherein the waste stream is highly acidic and contains ferrous, ferric or aluminum ions as pollutants which comprises: contacting said stream in countercurrent fashion with a cation exchange bed containing a weakly acidic cation exchange resin to deposit said ferrous, ferric or aluminum ions thereon, neutralizing the acidic effluent from the cation exchange resin with calcium hydroxide or calcium carbonate to provide a neutral effluent and regenerating said cation exchange resin with an organic solution of a chelating agent.

13. The method of claim 10 wherein the chelating agent is a β-diketone.

References Cited

UNITED STATES PATENTS

| | | | |
|---|---|---|---|
| 3,388,058 | 6/1968 | Wirth | 210—32 |
| 2,749,306 | 6/1956 | Coleman | 210—32 |
| 2,628,165 | 2/1953 | Bliss | 210—28 X |
| 3,305,306 | 2/1967 | Morawe et al. | 210—30 X |
| 2,954,276 | 9/1960 | Hazen | 210—28 X |
| 3,211,521 | 10/1965 | George et al. | 75—101 BE |
| 3,663,163 | 5/1972 | DePree et al. | 210—31 X |

FOREIGN PATENTS

| | | | |
|---|---|---|---|
| 1,206,038 | 9/1970 | Great Britain | 210—28 |

OTHER REFERENCES

Stary et al.: "Systematic Study of the Solvent Extraction of Metal β-Diketonates," Anal. Chim. Acta., 28 (1963), pp. 227–235.

REUBEN FRIEDMAN, Primary Examiner

T. G. WYSE, Assistant Examiner

U.S. Cl. X.R.

210—38; 75—101 BE